United States Patent [19]
Park

[11] Patent Number: 5,805,307
[45] Date of Patent: Sep. 8, 1998

[54] CONTACT IMAGE SENSOR ASSEMBLY FOR USE IN A FACSIMILE

[75] Inventor: Joon-Oh Park, Incheon, Rep. of Korea

[73] Assignee: Daewoo Telecom, Ltd., Rep. of Korea

[21] Appl. No.: 774,834

[22] Filed: Dec. 27, 1996

[30] Foreign Application Priority Data

Dec. 31, 1995 [KR] Rep. of Korea ............... 71067/1995

[51] Int. Cl.⁶ .............................. H04N 1/04; H04N 1/40
[52] U.S. Cl. .................. 358/471; 358/474; 358/483; 358/496
[58] Field of Search ........................... 358/474, 471, 358/496, 498, 400, 401, 482, 483, 473, 296, 505, 475, 513, 514; 382/312, 313; 355/75; 271/8.1, 109; 198/790–781, 788, 791; 250/208.1, 235, 236; 359/196–198

[56] References Cited

U.S. PATENT DOCUMENTS

| | | | |
|---|---|---|---|
| 4,835,619 | 5/1989 | Koberi et al. | 358/498 |
| 5,278,677 | 1/1994 | Lee et al. | 358/482 |
| 5,517,332 | 5/1996 | Barry et al. | 358/496 |
| 5,579,128 | 11/1996 | Cheng | 358/471 |
| 5,579,129 | 11/1996 | Iwata et al. | 358/498 |
| 5,602,650 | 2/1997 | Tamura et al. | 358/473 |

*Primary Examiner*—Edward L. Coles, Sr.
*Assistant Examiner*—Fan Lee
*Attorney, Agent, or Firm*—Pennie & Edmonds LLP

[57] ABSTRACT

A contact image sensor assembly for use in a facsimile comprises a scan roller and a contact image sensor to allow a manuscript to be passed therebetween during the rotation of the scan roller. The scan roller is rotatably mounted to a pair of side brackets having a slit, respectively, the slit having a roller fixing groove and a bent groove upwardly bent. A screw consists of a fastening portion fastened to a tap hole of the contact image sensor and an axle inserted into the slit. During the rotation of the scan roller, the axle of the screw is upwardly shifted along the bent groove while the contact image sensor is leftwardly biased by two springs, thereby automatically aligning with a desired scan point of the contact image sensor.

5 Claims, 5 Drawing Sheets

1

CONTACT IMAGE SENSOR ASSEMBLY FOR USE IN A FACSIMILE

FIELD OF THE INVENTION

The present invention relates to a facsimile; and, more particularly, to a contact image sensor assembly for use therein.

BACKGROUND OF THE INVENTION

Generally, a facsimile includes a roller for transporting a manuscript, a contact image sensor for reading out the content of the manuscript, and a spring for elastically contacting the image sensor with the roller.

There is shown in FIG. 1 a conventional contact image sensor assembly comprising a pair of side brackets 10, each of the side brackets 10 having a fixed pin 12, a scan roller 30 rotatably disposed between the side brackets 10, a contact image sensor 40 having two tap holes 42 at both ends thereof, respectively, a pair of fastening members 22 and 25 having two screw holes 26, respectively, so as to be fastened to the contact image sensor 40 by two screws 14, and a body 50 disposed between the side brackets 10 and having two springs 52 for elastically biasing the image sensor 40. Further, the fastening member 22 is provided with an inserting hole 23 inserted into the fixed pin 12 of one of the side brackets 10, while the fastening member 25 is provided with a stopper porion 27 for restricting an excessive rotation of the contact image sensor 40 and a hooking portion 24 hooked on the fixed pin 12 of the other of the side brackets 10.

As discussed above, in the conventional contact image sensor assembly, in order to mount the contact image sensor between the side brackets, each of the side brackets is provided with the fixed pin in addition to the separate fastening members, thereby making the manufacturing and assembling thereof difficult and increasing the manufacturing cost thereof. Further, in such a contact image sensor, the alignment of the scan point thereof with the scan roller is rather difficult and cumbersome.

SUMMARY OF THE INVENTION

Accordingly, it is an object of the invention to provide a contact image sensor assembly for use in a facsimile, which can be easily assembled.

It is another object of the invention to provide a contact image sensor assembly which allow an easy and precise alignment of a scan point of a contact image sensor with a scan roller during the assembling thereof.

The above and other objects of the present invention are accomplished by providing a contact image sensor assembly for use in a facsimile, the assembly comprising:

a pair of side brackets, each of the side brackets having a slit at a front end thereof, the slit having a roller fixing groove at one end thereof and a bent groove upwardly bent from the other end thereof;

a scan roller having an axis at both ends thereof, respectively, so as to allow the axis to be rotatably mounted to the roller fixing groove of the slit;

a contact image sensor coming in contact with the scan roller and having a tap hole at a lower portion of both ends thereof, respectively;

means for fastening the contact image sensor to the slit adjacent to the bent groove of each of the side brackets so as to allow movements along the bent groove;;

means for elastically biasing the contact image sensor toward the scan roller; and means for aligning a manuscript passed between the scan roller and the contact image sensor with a scan point of the contact image sensor.

BRIEF DESCRIPTION OF THE DRAWINGS

The above and other objects, features and advantages of the present invention will become apparent from the following detailed description of preferred embodiments taken in conjunction with the accompanying drawings, in which.

DETAILED DESCRIPTION OF THE PREFERRED EMBODIMENTS

Figure 1:
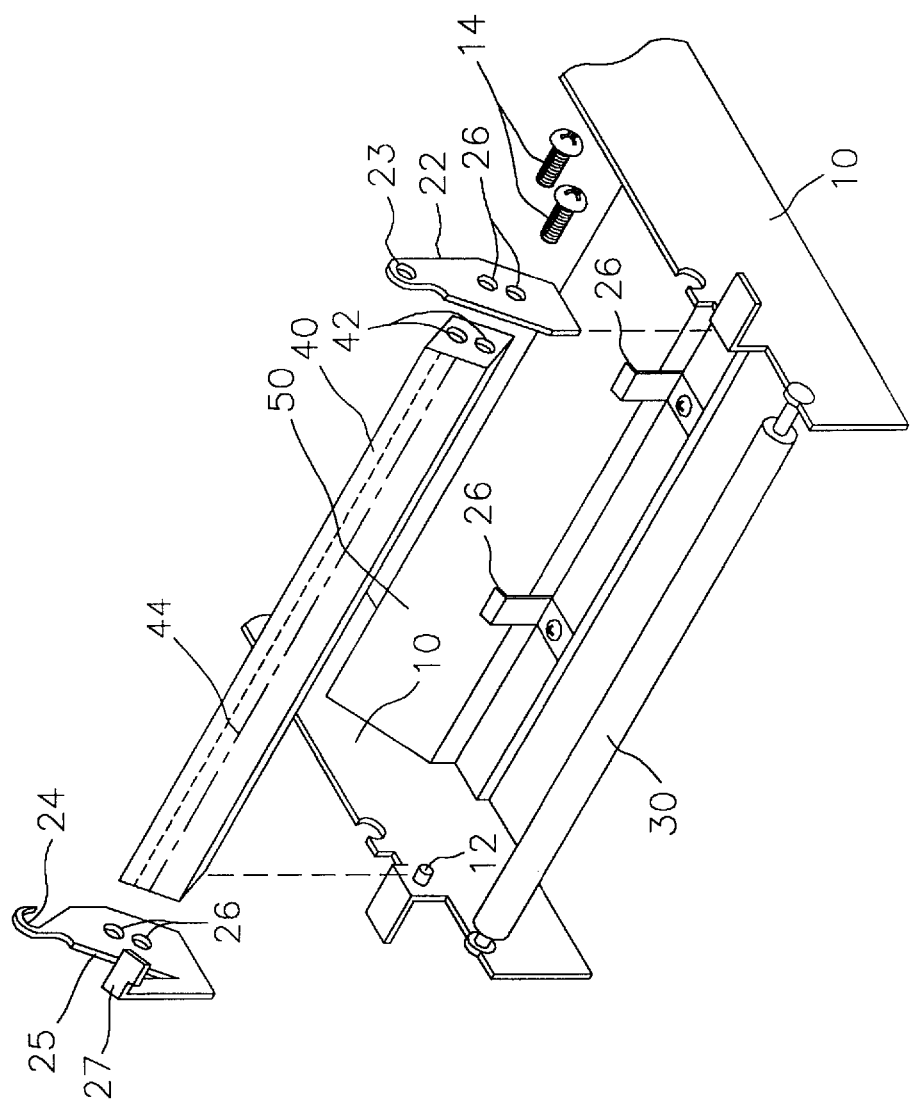
FIG. 1 is an exploded perspective view for showing a conventional contact image sensor assembly for use in a facsimile.
Figure 2A:
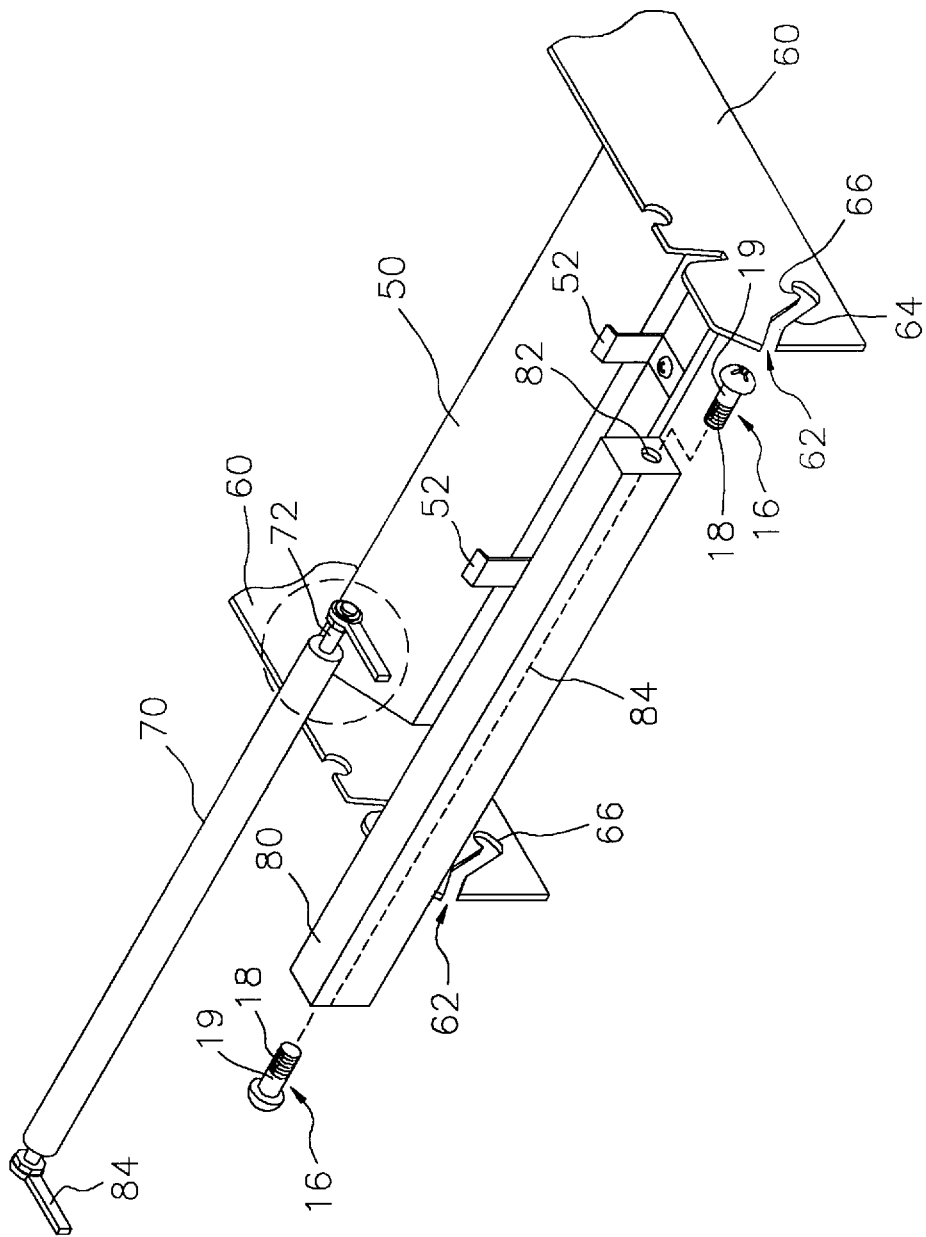
FIG. 2A is a exploded perspective view for showing a contact image sensor for use in a facsimile in accordance with the present invention.
Figure 2B:
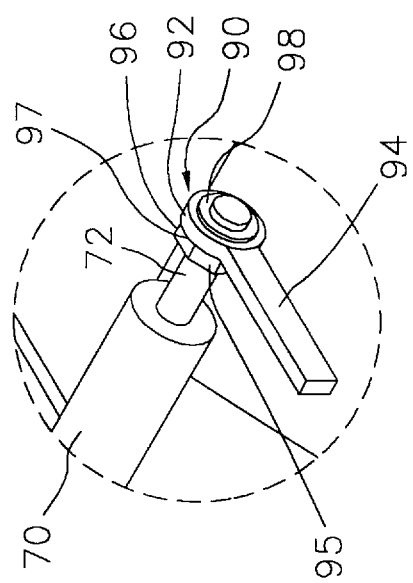
FIG. 2B is a detailed view of a bush shown in FIG. 2.

Referring now to FIG. 2A and 2B there is shown a contact image sensor assembly in accordance with a preferred embodiment of the present invention. The contact image sensor assembly shown includes a pair of side brackets 60, each of the side brackets 60 being provided with a slit 62 at a front end thereof, a scan roller 70 provided with an axis 72 at both ends thereof, respectively, a contact image sensor 80 coming in contact with the scan roller 70, and a bush 90 mounted to each of the axes 72 of the scan roller 70. Further, an E-ring 98 is mounted to each of the axes 72 of the scan roller 70 for preventing the bushes 90 from separating.

The slit 62 has a roller fixing groove 64 at one end thereof and a bent groove 66 upwardly bent from the other end thereof. The axis 72 of the scan roller 70 is rotatably mounted to the roller fixing groove 64 of the slit 62.

Figure 3A:
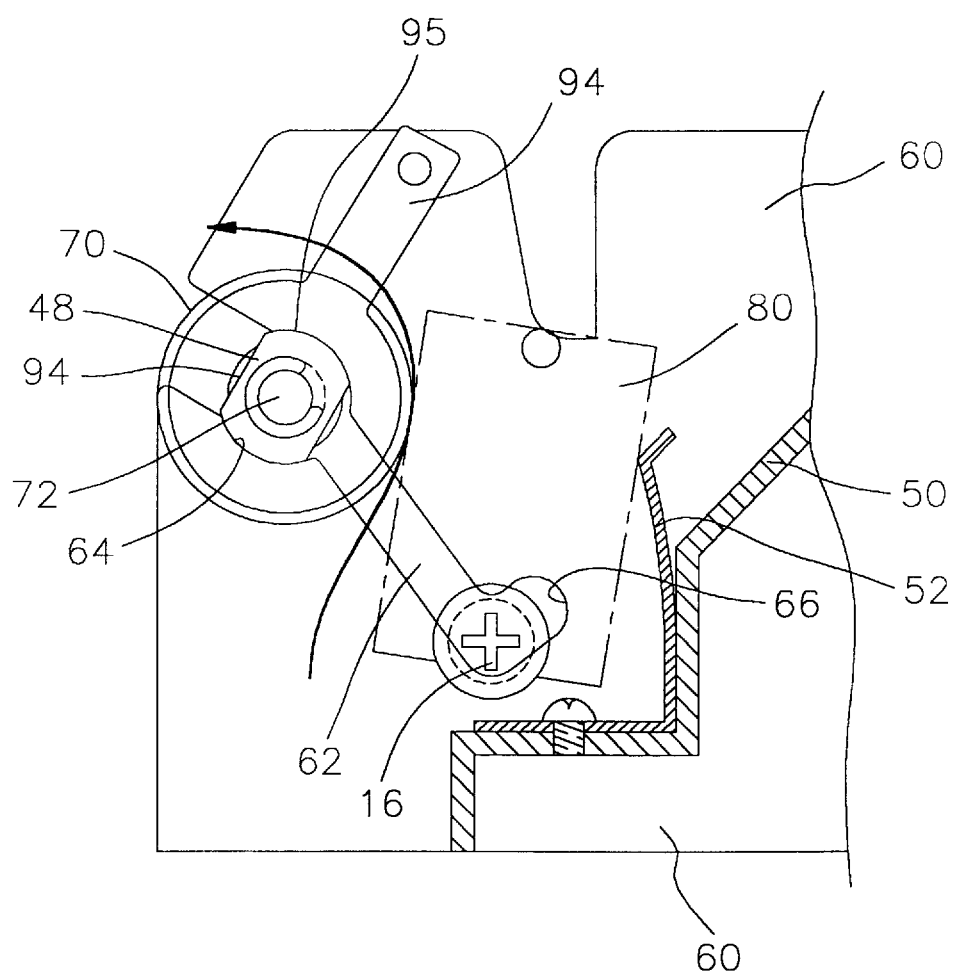
FIGS. 3A and 3B are side sectional views of the inventive contact image sensor assembly illustrating the assembling process thereof.

The contact image sensor 80 is provided with a tap hole 82 at a lower portion of both ends thereof, respectively, and is fastened to the slit 62 adjacent to the bent groove 66 of each of the side brackets 60 by a fastening means, for instant, a pair of screws 16. Each of the screw 16 has a fastening portion 18 fastened into the tap hole 82 and an axle 19 inserted into the slit 62 adjacent to the bent groove 66 as shown in FIG. 3A to thereby allow movements along the bent groove 66. Further, the contact image sensor 80 is elastically biased toward the scan roller 70 by two springs 52 mounted to a body 50.

Further, as shown in FIG. 2B the bush 90 has a step portion 92 with a lever 94 and an inserting portion 96 with two rounded surfaces 95 and two straight surfaces 97. The straight surfaces 96 are guided along the slit 62 during the insertion of the bush 90 into the slit 62 and the rounded surfaces 97 are fitted to the roller fixing groove 64 of the slit 62 by rotating the lever 94.

Figure 3B:
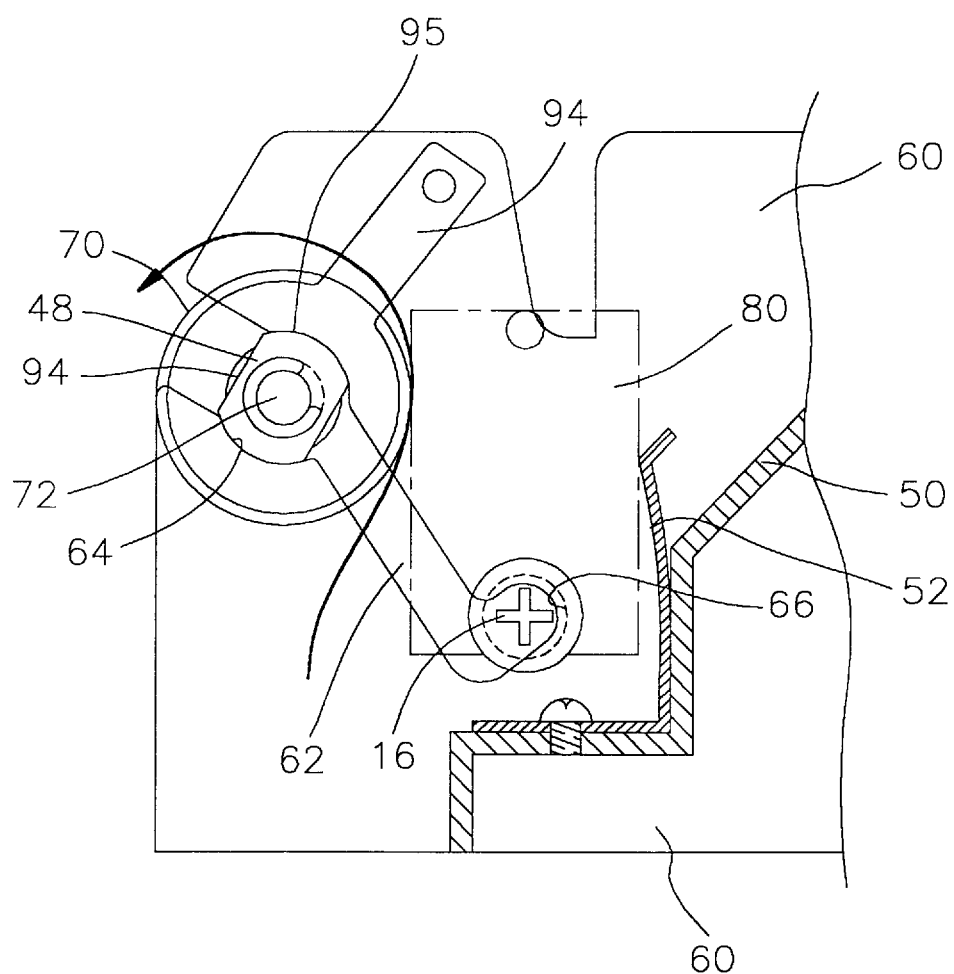

When the scan roller 70 is rotated as shown in an arrow in FIG. 3A, a manuscript is passed between the scan roller 70 and the contact image sensor 80. At this time, the axle 19 of the screw 16 inserted into the slit 62 adjacent to the bent groove 66 as shown in FIG. 3A is upwardly shifted along the bent groove 66 while the contact image sensor is leftwardly biased by two springs 52 as shown in FIG. 3B. This results in the contact image sensor 80 being shifted upwardly and leftwardly, thereby allowing the manuscript to be automatically aligned with a desired scan point 84 thereof.

As described above, the contact image sensor assembly in accordance with the present invention can easily be assembled as well as allowing a precise alignment of the scan point of the contact image sensor with the scan roller.

Although the invention has been shown and described with respect to the preferred embodiments, it will be understood by those skilled in the art that certain changes and modifications may be made without departing from the scope of the invention as defined in the following claims.

What is claimed is:

1. A contact image sensor assembly for use in a facsimile, the assembly comprising:

a pair of side brackets, each of the side brackets having a slit at a front end thereof, the slit having a roller fixing groove at one end thereof and a bent groove upwardly bent from the other end thereof;

a scan roller having an axis at both ends thereof, respectively, so as to allow the axis to be rotatably mounted to the roller fixing groove of the slit;

a contact image sensor coming in contact with the scan roller and having a tap hole at a lower portion of both ends thereof, respectively;

means for fastening the contact image sensor to the slit adjacent to the bent groove of each of the side brackets so as to allow movements along the bent groove;

means for elastically biasing the contact image sensor toward the scan roller; and means for aligning a manuscript passed between the scan roller and the contact image sensor with a scan point of the contact image sensor.

2. The contact image sensor assembly of claim 1, further comprising a bush mounted to the axis of the scan roller and an E-ring for preventing the bush from separating, the bush having a step portion with a lever and an inserting portion with two rounded surfaces and two straight surfaces.

3. The contact image sensor assembly of claim 2, wherein the straight surfaces are guided along the slit during the insertion of the bush into the slit and the rounded surfaces are fitted to the roller fixing groove of the slit by rotating the lever.

4. The contact image sensor assembly of claim 1, wherein the fastening means is a pair of screws, each of the screws having a fastening portion fastened into the tap hole and an axle inserted into the slit adjacent to the bent groove.

5. The contact image sensor assembly of claim 4, wherein the axle of the screw is upwardly shifted along the bent groove during the rotation of the scan roller, thereby aligning the manuscript with the scan point.

* * * * *